United States Patent
Suzuki

(10) Patent No.: US 8,260,541 B2
(45) Date of Patent: Sep. 4, 2012

(54) POWER SUPPLY CONTROL APPARATUS OF NAVIGATION SYSTEM

(75) Inventor: Motohiro Suzuki, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 338 days.

(21) Appl. No.: 12/795,179

(22) Filed: Jun. 7, 2010

(65) Prior Publication Data

US 2010/0324809 A1 Dec. 23, 2010

(30) Foreign Application Priority Data

Jun. 18, 2009 (JP) ................................. 2009-145178

(51) Int. Cl.
*G01C 21/00* (2006.01)
(52) U.S. Cl. ..................................... 701/400; 340/425.5
(58) Field of Classification Search ................ 701/1, 36, 701/400, 70, 71, 82; 340/988, 995.1, 425.5, 340/539.3; 361/679.21
See application file for complete search history.

(56) References Cited

U.S. PATENT DOCUMENTS

| | | | | | |
|---|---|---|---|---|---|
| 4,933,664 | A | * | 6/1990 | Igawa et al. ................ | 340/425.5 |
| 5,186,015 | A | * | 2/1993 | Roehrich et al. ................ | 62/133 |
| 5,218,338 | A | * | 6/1993 | Chang ..................... | 340/426.12 |
| 6,101,443 | A | * | 8/2000 | Kato et al. .................... | 701/414 |
| 6,125,323 | A | * | 9/2000 | Nimura et al. ................ | 701/410 |
| 6,310,617 | B1 | * | 10/2001 | Nunokawa et al. ........... | 345/211 |
| 2002/0049529 | A1 | * | 4/2002 | Ikeda ........................... | 701/200 |
| 2004/0204806 | A1 | * | 10/2004 | Chen et al. ...................... | 701/36 |
| 2004/0204816 | A1 | * | 10/2004 | Dery ............................ | 701/113 |
| 2005/0192742 | A1 | * | 9/2005 | Okochi ......................... | 701/209 |
| 2006/0058945 | A1 | * | 3/2006 | Watanabe ..................... | 701/200 |
| 2006/0259235 | A1 | * | 11/2006 | Yamakage ..................... | 701/208 |
| 2007/0018797 | A1 | * | 1/2007 | Chen et al. ................ | 340/425.5 |
| 2007/0106469 | A1 | * | 5/2007 | Ishizaki ........................ | 701/211 |
| 2007/0150134 | A1 | * | 6/2007 | Yamamoto ..................... | 701/30 |
| 2007/0198167 | A1 | * | 8/2007 | Dery ............................. | 701/113 |
| 2008/0133083 | A1 | * | 6/2008 | Ozaki ............................ | 701/36 |
| 2009/0018766 | A1 | * | 1/2009 | Chen et al. .................... | 701/202 |
| 2010/0066562 | A1 | * | 3/2010 | Stahlin et al. ................. | 340/902 |

FOREIGN PATENT DOCUMENTS

| | | |
|---|---|---|
| JP | A-06-275389 | 9/1994 |
| JP | A-08-268105 | 10/1996 |
| JP | A-2005-189060 | 7/2005 |
| JP | A-2006-162442 | 6/2006 |
| JP | A-2006-208304 | 8/2006 |
| JP | A-2006-214945 | 8/2006 |
| JP | A-2008-139223 | 6/2008 |

OTHER PUBLICATIONS

Japanese Office Action issued in Japanese Patent Application No. 2009-145178 on Apr. 12, 2011 (with translation).

* cited by examiner

*Primary Examiner* — Thomas Black
*Assistant Examiner* — Ce Li
(74) *Attorney, Agent, or Firm* — Oliff & Berridge, PLC

(57) ABSTRACT

A power supply control apparatus of a navigation system includes a power switch for a user to turn a display screen of the navigation system on or off; a navigation power switching unit to turn an internal function of the navigation system on or off by a power supply connection; a navigation information unnecessary state detecting unit to detect a navigation information unnecessary state where a user does not need navigation information; and a power supply control unit to turn the navigation power switching unit off when the navigation information unnecessary state detecting unit detects the navigation information unnecessary state.

10 Claims, 12 Drawing Sheets

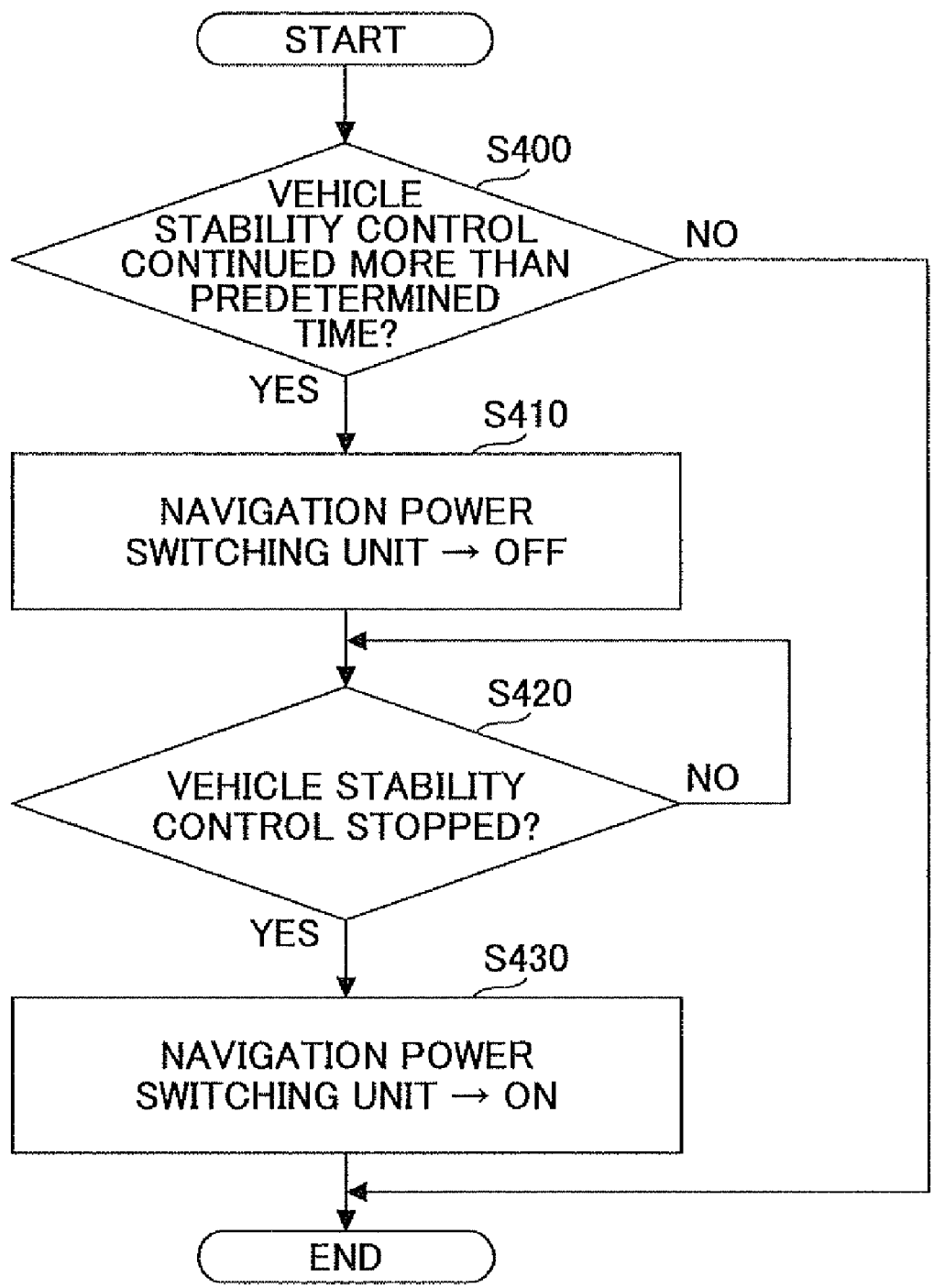

POWER SUPPLY CONTROL APPARATUS OF NAVIGATION SYSTEM

CROSS-REFERENCE TO RELATED APPLICATIONS

This patent application is based upon and claims the benefit of priority of Japanese Patent Application No. 2009-145178 filed on Jun. 18, 2009, the entire contents of which are incorporated herein by reference.

BACKGROUND OF THE INVENTION

1. Field of the Invention

The present invention generally relates to power supply control apparatuses of navigation systems. More specifically, the present invention relates to a power supply control apparatus of a navigation system including a power switch for a display screen that a user can switch on and off.

2. Description of the Related Art

Conventionally, a navigation system is known that detects a vehicle position, shows a path to a goal and the like on a display screen by a map and provides own vehicle position information and goal information for a user. The navigation system often includes a display screen power switch for a user that can switch the display screen on and off in terms of providing information only when the user wants display information.

On the other hand, once a power supply of the navigation system is completely turned off, it takes a certain amount of time to rise up (reboot) like a personal computer. Hence, in terms of maintaining responsiveness of an apparatus, even when the display screen power switch is turned off, an internal function of the navigation system itself often keeps working, receiving GPS (Global Positioning System) data and the like. This allows the navigation system to show and provide map information including the own vehicle position for the user when the user needs the information of the navigation system and turns on the display screen power switch.

However, in the above-mentioned conventional navigation system, even if the user turns off the display screen power switch, since the navigation system shows only a black image on the display screen and the usual internal function such as a own vehicle position search continues to work, electric power is consumed as well as in a case where the display screen power switch is turned on.

On the other hand, there is a case where the information of the navigation system is apparently not needed such as a case where the user checks an engine room leaving an engine operating, or a case where vehicle stability control and the like are performed because a vehicle skids. Moreover, the user may want to completely turn off all functions of the navigation system to cut wasteful power consumption when the user does not need the information of the navigation system at all. Even in such a case, the conventional navigation system does not entirely shut down due to terms of emphasizing responsiveness, but continues to consume electric power as well as that while normally working, which has prevented improving gasoline mileage.

As a similar technique, a drive control apparatus of an operating vehicle is disclosed in Japanese Patent Application Laid-Open Publication No. 08-268105, where an engine automatically stops when a hood is opened, and the stopped engine can enter a workable state where a human operation is performed. Furthermore, the workable state is automatically canceled once the hood is closed, and the engine can be automatically stopped again when the hood is opened next.

SUMMARY OF THE INVENTION

Embodiments of the present invention provide a novel and useful power supply control apparatus of a navigation system solving one or more of the problems discussed above.

More specifically, embodiments of the present invention provide a power supply control apparatus of a navigation system to be able to save electric power by turning off an internal function of a navigation system and to improve gasoline mileage when power for a display screen is off and the navigation system is unnecessary.

According to one aspect of the present invention, a power supply control apparatus of a navigation system is provided for saving electric power consumption of a navigation system and for improving gasoline mileage of a vehicle, the apparatus including:

- a power switch for a user to turn a display screen of the navigation system on or off;
- a navigation power switching unit to turn an internal function of the navigation system on or off by a power supply connection;
- a navigation information unnecessary state detecting unit to detect a navigation information unnecessary state where a user does not need navigation information; and
- a power supply control unit to turn the navigation power switching unit off when the navigation information unnecessary state detecting unit detects the navigation information unnecessary state.

Additional objects and advantages of the embodiments are set forth in part in the description which follows, and in part will become obvious from the description, or may be learned by practice of the invention. The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

FIG. 12 is a processing flow diagram of the power supply control apparatus of the navigation system 10 of the sixth embodiment.

DETAILED DESCRIPTION OF THE PREFERRED EMBODIMENTS

A description is given below, with reference to drawings of embodiments of the present invention.

First Embodiment

Figure 1:
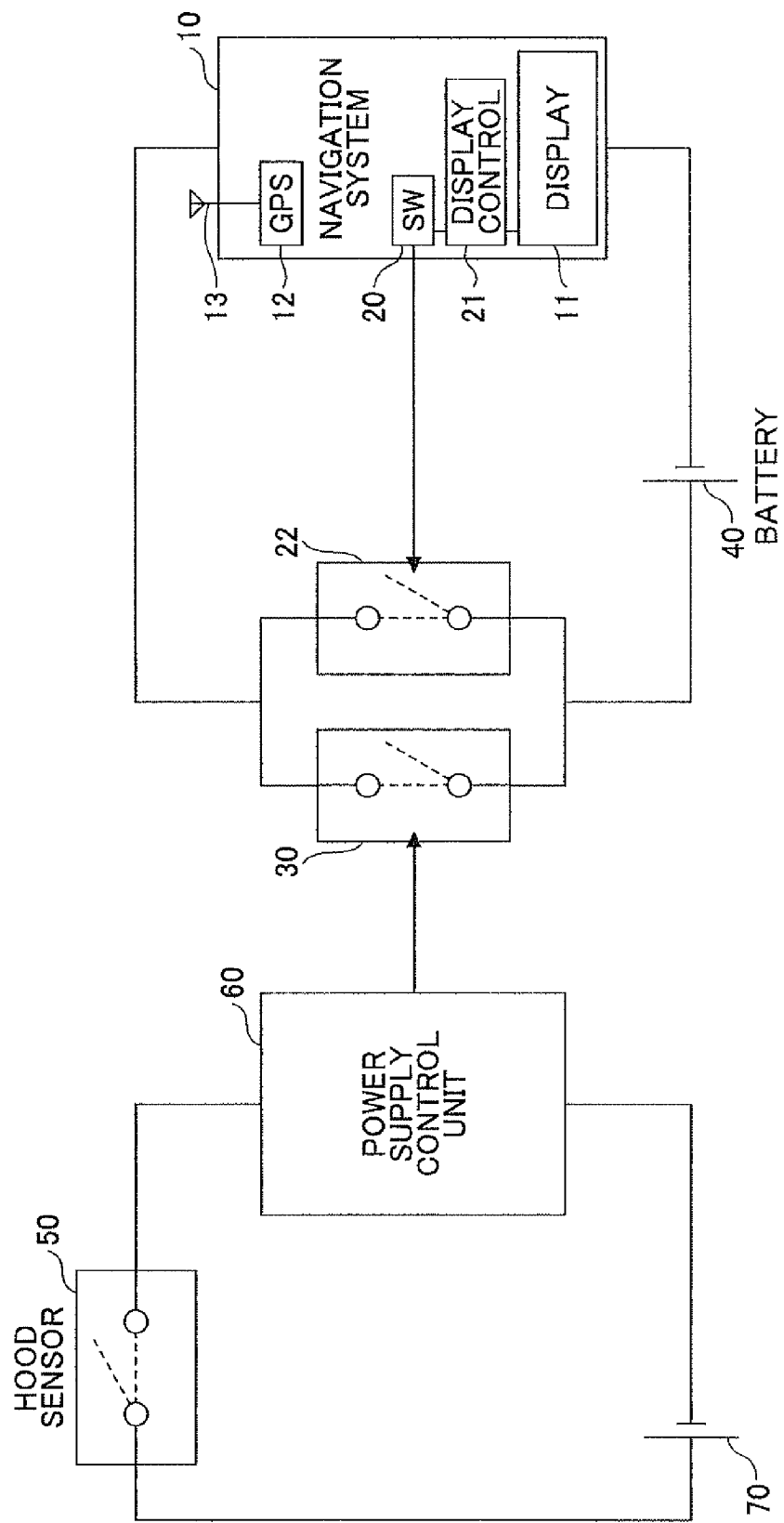
FIG. 1 is an overall configuration diagram showing an example of a power supply control apparatus of a navigation system of a first embodiment of the present invention.

FIG. 1 is a diagram showing an overall configuration of a power supply control apparatus of a navigation system of a first embodiment of the present invention. In FIG. 1, the power supply control apparatus of the navigation system includes a navigation system 10, a power switch 20 for a user, a power switching unit 22 for a user, a navigation power switching unit 30, a battery 40, an engine hood sensor 50, a power supply control unit 60 and a power supply 70.

The navigation system 10 is a unit that provides map information such as own vehicle position information and path information to a goal for a user. The navigation system 10 includes a display screen 11, a GPS (i.e., Global Positioning System) receiver 12, the power switch 20 for a user and a display screen control unit 21.

The display screen 11 is a unit that shows and provides visual information such as the map information for a user. Various kinds of displays such as a liquid crystal display are available for the display screen 11.

The GPS receiver 12 is a unit that receives and demodulates radio waves transmitted from satellites, including own vehicle position information. Hence, the GPS receiver 12 includes an antenna 13. The GPS receiver 12 works as an internal function of the navigation system 10, and can function not only in a case where the display screen 11 is in an on state and shows the map information, but also in a case where the display screen 11 is in an off state and does not show the map information. This makes it possible to immediately show the map information on the display screen 11 if the user first turns the display screen 11 off, and then turns the display screen 11 on when the user needs the map information again. Because the navigation system 10 needs a certain amount of time for rising (rebooting) like a personal computer, the navigation system 10 leaves its internal function working to ensure responsiveness even when the user turns the display screen 11 off. This makes it possible to promptly provide the map information for the user in response to a request from the user, but electric power is continuously consumed.

Here in FIG. 1, only a GPS receiving function with the GPS receiver 12 is shown as the internal function of the navigation system 10; there may be another internal function. For example, a function obtaining traffic information such as traffic jam forecasting by using communication information other than the GPS, or a latest map updating function that updates the map itself can work as the internal function of the navigation system 10 without depending on the on/off of the display screen 11.

The power switch 20 for a user is a switching operation unit that can switch between the on and off of the display screen 11 in the navigation system 10 by user's operation. The power switch 20 for a user is connected to the display screen control unit 21 and the power switching unit 22 for a user.

The display screen control unit 21 is controls the on/off (i.e., display or hidden) of the display screen 11, according to the on/off of the power switch 20 for a user. The display screen control unit 21 may be a mere switching unit that controls the on/off, or may be configured as an electronic control unit to control a whole display action of the display screen 11.

The power switch 20 for a user may be provided in the navigation system 10. Since the user can switch the on/off of the display screen 11 by operating the on/off of the power switch 20 for a user, the power switch 20 for a user acts like a power supply switch of the navigation system 10 for the user.

However, in fact, the power switch 20 for a user has only a function that switches existence or nonexistence of a display on the display screen 11, but does not have even a switching function that turns the internal function of the above-mentioned navigation system on or off. More specifically, when the power switch 20 for a user is turned off, the display screen 11 becomes off, and a black screen does not display any information, but the internal function itself of the navigation system 10 continues to work. Moreover, the display screen 11 may be thought to be in a state to display a black off image that shows an off state by the display screen control unit 21, rather than in an actual off state. In this way, the power switch 20 for a user can turn off the display on the display screen 11 of the navigation system 10 by a user's operation, but is a switch that does not completely turn off the whole power supply for the navigation system 10.

The power switching unit 22 for a user is a power connection switching unit that switches a connection of the navigation system 10 to the battery 40 by turning connected or non-connected. In other words, the power switching unit 22 for a user is linked to the power switch 20 for a user, and the power switching unit 22 for a user performs an on/off action in accordance with an on/off of the power switch 20 for a user.

The power switching unit 22 for a user is connected to a current supply path to the navigation system 10 of the battery 40. The power switching unit 22 for a user connects the navigation system 10 to the battery 40 when the power switch button 20 for a user is turned on, and disconnects the navigation system 10 from the battery 40 when the power switch button 20 for a user is turned off. Various kinds of units are available for the power switching unit 22 for a user, as long as the units are a connection switching unit that works with the power switch 20 for a user and can turn on or off the connection of the navigation system 10 to the battery 40. For example, a relay can be used for the power switching unit 22 for a user. In addition to that, a semiconductor switching device such as a MOS (i.e., Metal Oxide Semiconductor) transistor and the like, or other switching units are available for the power switching unit 22 for a user.

The battery 40 is a power supply to supply electric power for the navigation system 10. In FIG. 1, the battery 40 is shown as an example of a power supply that supplies the electric power for the navigation system 10. It may be possible that an alternator and the like are also connected to the navigation system 10, and the alternator supplies the electric power for the navigation system 10 while the vehicle is running. The power supply control apparatus of the navigation system 10 in the embodiment saves electric power supplied for the navigation system 10 and reduces draining of the battery 40. Since the battery 40 stores electric energy generated by the alternator due to vehicle running, the gasoline mileage is improved by reducing the energy consumption of the battery 40.

The navigation power switching unit 30 is a power supply connection switching unit that switches electric supply for the navigation system 10 by connection and disconnection to the battery 40 according to a command from the power supply control unit 60. The navigation power switching unit 30 is provided in an electric supply path on the way from the battery 40 to the navigation system 10, and switches between the connection and disconnection of the navigation system 10 to the battery 40.

In FIG. 1, the navigation power switching unit 30 is connected in parallel to the power switching unit 22 for a user. This allows the battery 40 to supply the electric power for the navigation system 10 as long as the navigation power switching unit 30 is in the on state, even if the power switching unit 22 for a user is turned off by the user. In this way, the navigation power switching unit 30 ensures the electric supply for the navigation system 10 by the battery 40 and enables the internal function of the navigation system 10 to work continuously, even if the power switching unit 22 for a user is in the off state and the display screen 11 is in the off state.

On the other hand, when both of the navigation power switching unit 30 and the power switching unit 22 for a user are turned off, it is possible to completely turn off the navigation system 10 including the display screen 11 and the internal function. Therefore, the power supply control apparatus of the navigation system 10 of the embodiment efficiently controls the on/off of the power supply for the navigation system 10, by controlling the navigation power switching unit 30 connected in parallel with the power switching unit 22 for a user.

Various kinds of switching units are available for the navigation power switching unit 30 as well as the power switching unit 22 for a user. For example, a relay is available for the power switching unit 22 for a user. Furthermore, a semiconductor switching device such as a MOS transistor or other switching units may be used for the navigation power switching unit 30.

The engine hood sensor 50 detects opening and closing of an engine hood (which may be also called a bonnet). The engine hood sensor 50 functions as a navigation information unnecessary state detecting unit that detects that the information such as the map information the navigation system 10 provides is in an unnecessary state for the user. Various vehicle states are conceivable where the user thinks the navigation information is unnecessary, but the power supply control apparatus of the navigation system 10 of the first embodiment detects the navigation information unnecessary state by using the engine hood sensor 50.

For example, even when the engine is working, if the engine hood is open, it is thought that the user or a repair person in charge is checking an engine or performing adjustments or repairs. Then, because it is unthinkable that the vehicle runs where the engine hood is open, it is thought that the engine hood opening state while the engine is working is where the user does not need the information the navigation system 10 provides. Therefore, if the engine hood is open, turning off the power supply of the navigation system 10 including the internal function does not cause any functional problems. In this manner, if it is possible to detect the vehicle state where the user certainly does not need the navigation information, which is impossible in a usual run, the power consumption of the navigation system 10 can be eliminated by completely turning the navigation system 10 off at the timing.

Figure 2:
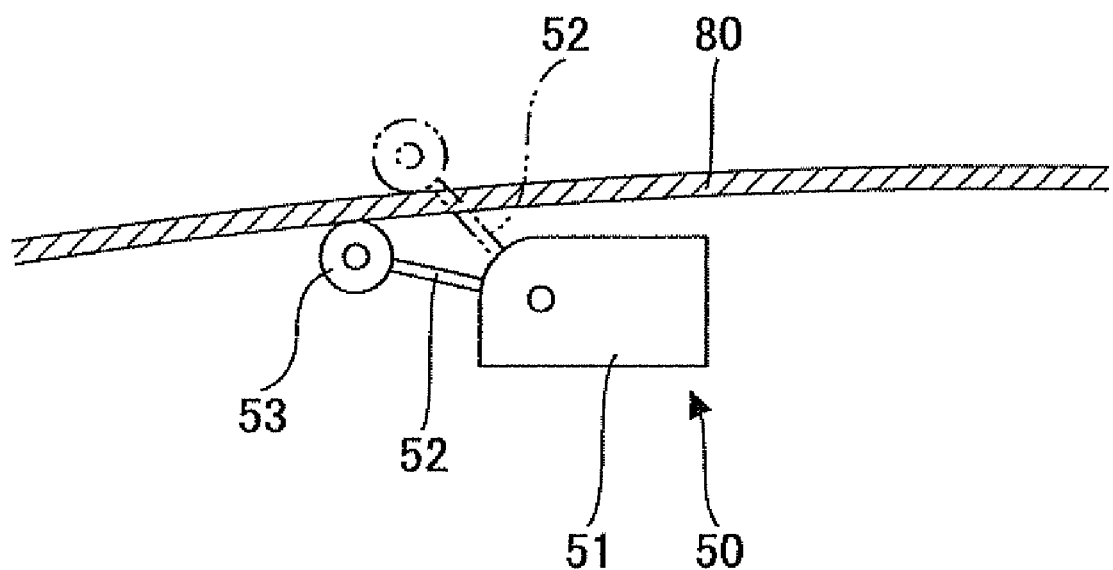
FIG. 2 is a diagram showing an example of a configuration of an engine hood sensor.

FIG. 2 is a diagram showing an example of a configuration of the engine hood sensor 50. The engine hood sensor 50 includes a body 51, a lever 52 and a roller 53. As shown in FIG. 2, the engine hood sensor 50 may be provided under the engine hood 80. The engine hood sensor 50 is in a state where the roller 53 on which an upward force is acting is held from above by contacting a lower surface of the engine hood 80 that applies a force downward. The upward force acts on the lever 52 and presses the roller 53 upward onto the lower surface of the engine hood 80. In this state, if the engine hood 80 opens, as shown by dotted lines in FIG. 2, the roller 53 and the lever 52 move upward, by which opening of the engine hood 80 can be detected. For example, by outputting an electronic on signal when the engine hood 80 is open and the lever 52 moves upward, the opening state of the engine hood 80 can be detected. Or, it may be possible that the electric on signal is output when the engine hood 80 is closed, and the electric signal is stopped and becomes electrically off when the engine hood 80 opens.

Thus, it is possible to easily detect the state where the engine hood 80 is open by using the engine hood sensor 50 shown in FIG. 2. FIG. 2 shows an example of the engine hood sensor 50, but various forms of engine hood sensors 50 are applicable as long as the engine hood sensor 50 can detect the opening state of the engine hood 80.

The explanation returns to FIG. 1. The power supply control unit 60 controls switching the navigation power switching unit 30, based on the output of the engine hood sensor 50 (i.e., the navigation information unnecessary state detecting unit), the state of the navigation power switching unit 22 for a user and the state of the navigation power switching unit 30. Specifically, the power supply control unit 60 controls to turn the navigation power switching unit 30 off when the engine hood sensor 50 detects the opening of the engine hood 80, where the navigation switching unit 22 for a user is in the off state, and the navigation power switching unit 33 is in the on state. This turns both of the power switching unit 22 for a user and the navigation power switching unit 30 off, which allows the navigation system 10 to be completely disconnected from the battery 40, and to be completely turned off.

To perform such power supply control that switches the navigation power switching unit 30 from on to off, the power supply control unit 60 monitors the on/off state of the power switching unit 22 for a user, the on/off state of the navigation power switching unit 30 and the opening state signal of the engine hood sensor 50. Then, the power supply control unit 60 controls switching the navigation power switching unit 30 from on to off when a condition is met where the power switching unit 22 for a user is in the off state, the navigation power switching unit 30 is the on state and the engine hood sensor 50 detects the opening state of the engine hood 80. Hence, to carry out such a determination operation, the power supply control unit 60 may be configured as an ASIC (i.e., Application Specific Integrated Circuit) including a predetermined circuit, or an electronic control unit including a microcomputer and the like that include a CPU (i.e., Central Processing Unit) and execute operational processing by reading a program.

The power supply control unit 60 may be configured to start an operation when the engine starts. This is because, when the engine is not operated, the navigation system 10 does not operate until the user purposely activates the navigation system 10, and wasteful electric power consumption does not occur.

The power supply control unit 60 may be independently configured or may be configured as an integrated part of an engine control computer that controls the engine and the like.

If the power supply control unit 60 is mounted on the engine control computer, the power supply control unit 60 operates when the engine operates.

The power supply 70 supplies electric power for the engine hood sensor 50 and the power supply control unit 60, and for example, the electric power may be supplied from a vehicle-mounted battery or an alternator. As mentioned above, since it is enough to perform power delivery from the power supply 70 when the engine operates, a power supply from an ignition power supply system, not from an accessory power supply system, may be used.

Figure 3:
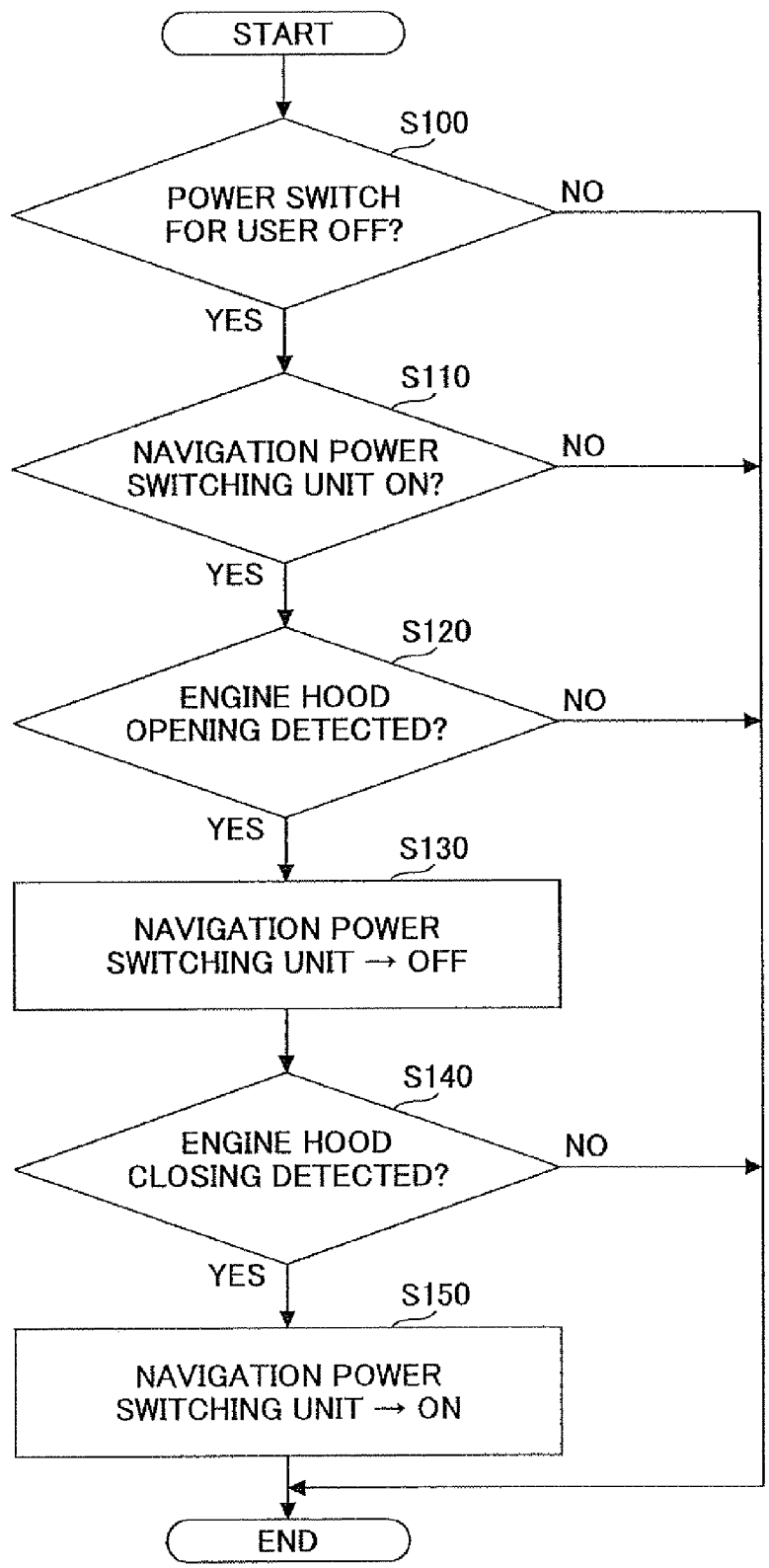
FIG. 3 is a processing flow diagram of the power supply control apparatus of the navigation system of the first embodiment.

Next, with reference to FIG. 3, a description is given about an operation of the power supply control apparatus of the navigation system 10 of the first embodiment. FIG. 3 is a processing flow diagram of the power supply control apparatus of the navigation system 10 of the first embodiment. The same numerals are used for similar components to those in the above description, and the descriptions about the similar components are omitted or simplified.

In Step S100, the power supply control unit 60 determines whether the power switch 20 for a user is in an off state. Since the power switch 20 for a user is linked to the power switching unit 22 for a user, the power supply control unit 60 may determine whether the power switch 20 for a user is in the off state by monitoring the power switching unit 22.

In Step S100, if the power switch 20 for a user is in an on state, the navigation system 10 leave the navigation system working because the navigation system 10 is in the on state by user's intention. Since this case is not appropriate to turn the navigation system 10 off and to save the electric power, the processing flow in FIG. 3 finishes. On the other hand, if the power switch 20 for a user is in the off state, the process advances to Step S110.

In Step S110, the power supply control unit 60 determines whether the navigation power switching unit 30 is in the on state. Because the power supply control unit 60 monitors the navigation power switching unit 30, it is possible to immediately determine the on/off state of the navigation power switching unit 30.

In Step S110, if the power supply control unit 60 determines that the navigation power switching unit 30 is in the off state, the navigation system 10 is already completely in the off state including the internal function. Therefore, since the power supply control unit 60 does not need to newly turn the power supply off, the processing flow in FIG. 3 finishes. On the other hand, if the power supply control unit 60 determines that the navigation power switching unit 30 is in the on state, the process proceeds to Step S120.

In Step S120, the power supply control unit 60 determines whether the engine hood sensor 50 detects the engine hood opening state, that is, the user is in a navigation information unnecessary state. The determination may be carried out depending on whether the engine hood sensor 50 outputs a detection signal detecting that the engine hood 80 is in an opening state.

In Step S120, if the engine hood opening state is not detected from the engine hood sensor 50, the processing flow finishes once, and the processing flow is repeated from the beginning. In other words, the power supply control apparatus becomes in a standby state that continuously repeats the processing flow in FIG. 3 from start through Step S120. In contrast, if the opening state of the engine hood 80 is detected from the engine hood sensor 50 in Step S120, the process advances to Step S130.

In Step 130, the power supply control unit 60 determines that the condition for turning off the navigation switching unit 30 is met, and performs the power supply control to switch the navigation power switching unit 30 from on to off. By doing this, the power delivery for the navigation system 10 is completely turned off, and the power consumption in the navigation system stops. Since it is thought that the engine checking and the like are performed by opening the engine hood 80, the condition does not cause any inconvenience to the user even if the power delivery for the navigation system 10 stops. After finishing the process in Step S130, the process proceeds to Step S140.

In Step S140, the power supply control unit 60 determines whether the engine hood 80 is closed again. This step is provided as a returning condition for starting the navigation system 10. If the engine hood 80 is closed, the vehicle could start running and the user could need the information of the navigation system 10. Therefore, it is determined whether the condition should be adjusted to where restart is possible so that the navigation system 10 can provide information soon in response to user's request in the step.

In Step S140, if the power supply control unit 60 determines that the engine hood 80 continues to be in the opening state, the processing flow finishes. Then, the processing flow is continuously repeated and the process goes into a substantial standby state in Step S140. On the other hand, in Step S140, if the power supply control unit 60 determines that the engine hood 80 is in a closing state, the process advances to Step S150.

In Step S150, the power supply control unit 60 turns the navigation power switching unit 30 on, connects the navigation system 10 to the battery 40, and restarts the navigation system 10. By doing this, the internal function of the navigation system 10 works, and the navigation system 10 can provide the information such as the map information responding to a user's request when the user turns on the power switch 20 for a user. With this, the processing flow in FIG. 3 finishes once, and the processing flow is repeated from the beginning.

In this way, according to the power supply control apparatus of the navigation system 10 of the first embodiment, it is determined whether the user is in a state where the navigation information is unnecessary, based on an opening and closing state of the engine hood, and if the user is in the navigation information unnecessary state, wasteful power consumption can be suppressed by completely turning the power supply off.

In recent years, the navigation systems 10 have tended to grow in size, and a working current often reaches three to six A. Hence, by using the power supply control apparatus of the navigation system 10 of the first embodiment, it is possible to save the electric power and to improve the gasoline mileage by completely turning off the power supply when the information of the navigation system 10 is unnecessary.

Second Embodiment

Figure 4:
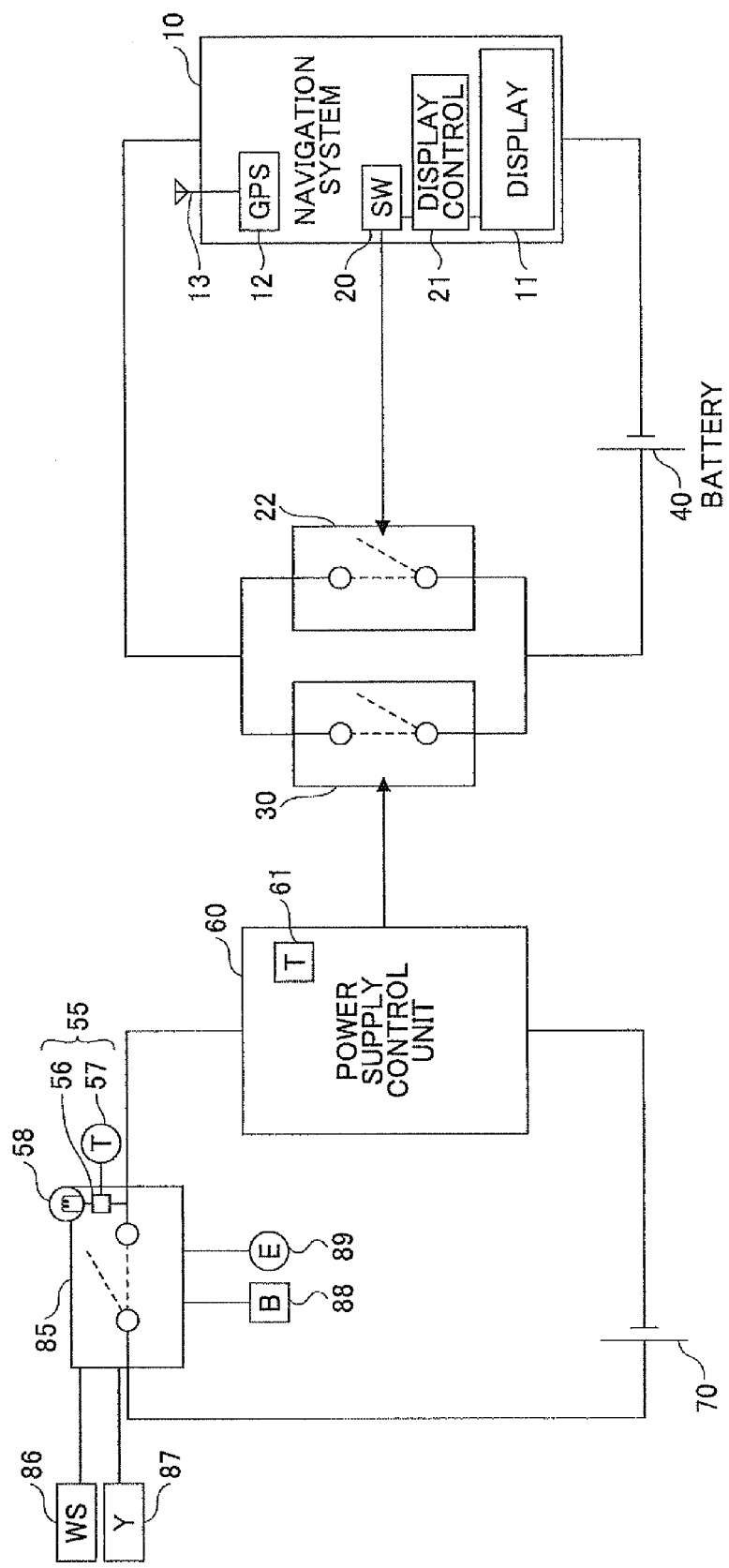
FIG. 4 is an overall configuration diagram showing a power supply control apparatus of a navigation system of a second embodiment of the present invention.

FIG. 4 is a diagram showing an example of an overall configuration of a power supply control apparatus of a navigation system 10 of a second embodiment of the present invention. In FIG. 4, the power supply control apparatus of the navigation system 10 in the second embodiment is common to the power supply control apparatus of the navigation system 10 in the first embodiment in that the power supply control apparatus of the navigation system 10 in the second embodiment includes a navigation system 10, a power switch 20 for a user, a power switching control unit 22 for a user, a navigation power switching unit 30, a battery 40 and a power supply 70. Moreover, the power supply control apparatus of the navigation system 10 in the second embodiment is common to the power supply control apparatus of the navigation system 10 in the first embodiment in that the navigation system 10 includes a display screen 11, a GPS receiver 12, a power switch 20 for a user and a display screen control unit 21.

The power supply control apparatus of the navigation system 10 of the second embodiment is different from the power supply control apparatus of the navigation system 10 in the first embodiment in that the power supply control apparatus of the navigation system 10 of the second embodiment includes a vehicle stability control unit 85, and a vehicle stability control continuous operation detecting unit 55 as a navigation information unnecessary detecting unit. The power supply control apparatus of the navigation system 10 of the second embodiment determines whether the user does not need the navigation information, based on an operating condition of the vehicle stability control unit 85, and performs power supply control to reduce wasteful power consumption of the navigation system 10. Here, same numerals may be used for similar components to those of the power supply control apparatus of the navigation system 10 of the first embodiment, and explanations about the similar components are omitted or simplified.

The vehicle stability control unit 85 is a unit that determines a side slip tendency of the vehicle in a circling direction, and controls to ease the side slip of the vehicle and to ensure the stability of the vehicle in the circling direction if the side slip tendency is detected. The vehicle stability control unit 85 may include a wheel speed sensor 86 and a yaw rate sensor 87 as related components to detect the side slip tendency of the vehicle. In addition, the vehicle stability control unit 85 controls hydraulic pressure of a brake system or output of the engine 89 to ease the side slip of the vehicle and to perform control that ensures the stability of the vehicle.

The vehicle stability control unit 85, for example, detects a number of revolutions per unit time of a front wheel and a rear wheel by using the wheel speed sensor 86, and detects free spinning of the front wheel and the rear wheel from a revolution number difference between the front wheel and the rear wheel. Here, a large revolution number difference between the front wheel and the rear wheel means that the free spinning occurs in the wheel revolving at a larger revolution number. With this, it is possible to detect what is called a slip state and the side slip tendency of the vehicle. Furthermore, the vehicle stability control unit 85 can detect a slip angle and a value of a slip angle rate of the vehicle by detecting a yaw rate of the vehicle with the yaw rate sensor 87. If the detected slip angle and slip angle rate are large, that means a vehicle body tends to be in a side slip state. This way, the vehicle stability control unit 85 can detect the side slip tendency of the vehicle by using the wheel speed sensor 86 or the yaw rate sensor 87.

The vehicle stability control unit 85 carries out the vehicle stability control to ease the side slip and to ensure the vehicle stability by controlling the hydraulic pressure of the brake 88 of each wheel and the output of the engine 89. For example, if the vehicle stability control unit 85 determines that a rear wheel side slip tendency is large, the vehicle stability control unit 85 puts a brake 88 on the front wheel outside the circle, causes the outward moment of the vehicle and suppresses the rear wheel side slip tendency. Also, if the vehicle stability control unit 85 determines that a front wheel side slip tendency is large, the vehicle stability control unit 85 controls the output of the engine 89 depending on a degree of the side slip, reduces a side force by putting the brake 88 on the front and rear wheel and suppresses the front wheel side slip tendency.

Here, for example, the vehicle stability control unit 85 may be configured as an ASIC or a microcomputer including a CPU in order to perform such a side-slip determination and a control operation.

In this way, the vehicle stability control performed by the vehicle stability control unit 85 is control where the vehicle is in a side slip tendency, a control of urgency. Moreover, the vehicle stability control may finish in a moment, or may continue for more than about ten seconds. For example, on a narrow winding lane such as a coastline road or a mountain road, it is possible for the vehicle stability control to continue more than about ten seconds. Thus, under the circumstance where there is no room for any activity but driving, if the user has already turned off the display screen 11 of the navigation system 10, it is unthinkable that the user dares to obtain the information of the navigation system 10. Therefore, if the vehicle stability control continues for more than or equal to a predetermined time, the power supply control apparatus can determine that the user is in the navigation information unnecessary state, and can completely turn off the navigation system 10 including its internal function. The power supply control apparatus of the navigation system in the second embodiment executes such power supply control.

The vehicle stability control continuous operation detecting unit 55 is a unit that detects that the vehicle stability control by the vehicle stability control unit 85 is maintained for more than or equal to a predetermined time, and a vehicle is in the navigation information unnecessary state where the navigation information is unnecessary for the user. The vehicle stability control continuous operation detecting unit 55 includes a vehicle stability control operation signal detecting unit 56 and a timer 57.

The vehicle stability control operation signal detecting unit 56 detects a signal indicating that the vehicle stability control is working. In general, while the vehicle stability control is working, a notice is issued to let the user know that the vehicle stability control unit 85 is performing the vehicle stability control. To provide such a notice, for example, a lamp 58, a buzzer and the like are used. In FIG. 4, the lamp 58 is used as a notification unit that indicates to the user that the vehicle stability control is working. The lamp 58 lets the user know that the vehicle stability control is working by lighting up or by blinking on and off while the vehicle stability control is working. Hence, the vehicle stability control operation signal detecting unit 56 can detect whether the vehicle stability control is working by detecting a lighting command signal output to the lamp 58 as an operation signal of the vehicle stability control. Therefore, for example, the vehicle stability control operation signal detecting unit 56 may be provided in a path of a signal line to the lamp 58. Here, since it is enough for the vehicle stability control operation signal detecting unit 56 to detect any signal indicating that the vehicle stability control is working, it is not limited to detecting the command signal to the lamp 58. Therefore, as long as the vehicle stability control operation signal detecting unit 56 can detect an operation signal indicating that the vehicle stability control is working, the vehicle stability control operation signal detecting unit 56 can be provided in any position.

The timer 57 is a time measurement unit that detects an operation duration time of the vehicle stability control. The timer 57 can be provided in various positions as long as the timer 57 can measure the operation duration time. In FIG. 4, because the vehicle stability control operation signal detecting unit 56 detects the duration time of the vehicle stability control, the timer 57 is provided connected to the vehicle stability control operation signal detecting unit 56 so as to measure the operation duration time that the vehicle stability control operation signal detecting unit 56 detects. Here, the timer 57 may be provided in an integrated manner with the vehicle stability control operation signal detecting unit 56. With this, it is possible to detect whether the vehicle stability control continues more than or equal to a predetermined time. Here, the predetermined time may be set depending on intended purpose. For example, the predetermined time may be set at eight seconds, ten seconds or twelve seconds. The duration time can be set at an appropriate time depending on the intended purpose.

The timer 57 may be provided as a timer 61, not on the vehicle stability control unit 85 side, but on the power supply control unit 60. For example, it may be possible that the operation signal of the vehicle stability control is output to the power supply control unit 60, and the power supply control unit 60 determines whether the operation signal is output more than or equal to the predetermined time. Because the power supply control unit 60 finally determines whether the navigation power switching unit 30 should be switched from on to off, the power supply control unit 60 may also determine whether the navigation information unnecessary state is met. Since the vehicle stability control unit 85 is configured as an electronic control unit and the power supply control unit 60 is also configured as an electronic control unit, regarding role allotment of both, a proper internal configuration may be adopted, considering mutual operational load balancing and the like.

Here, as discussed above, since the other components are similar to those of the power supply control apparatus of the navigation system 10 in the first embodiment, the same numerals are used and the explanations are omitted.

Figure 5:
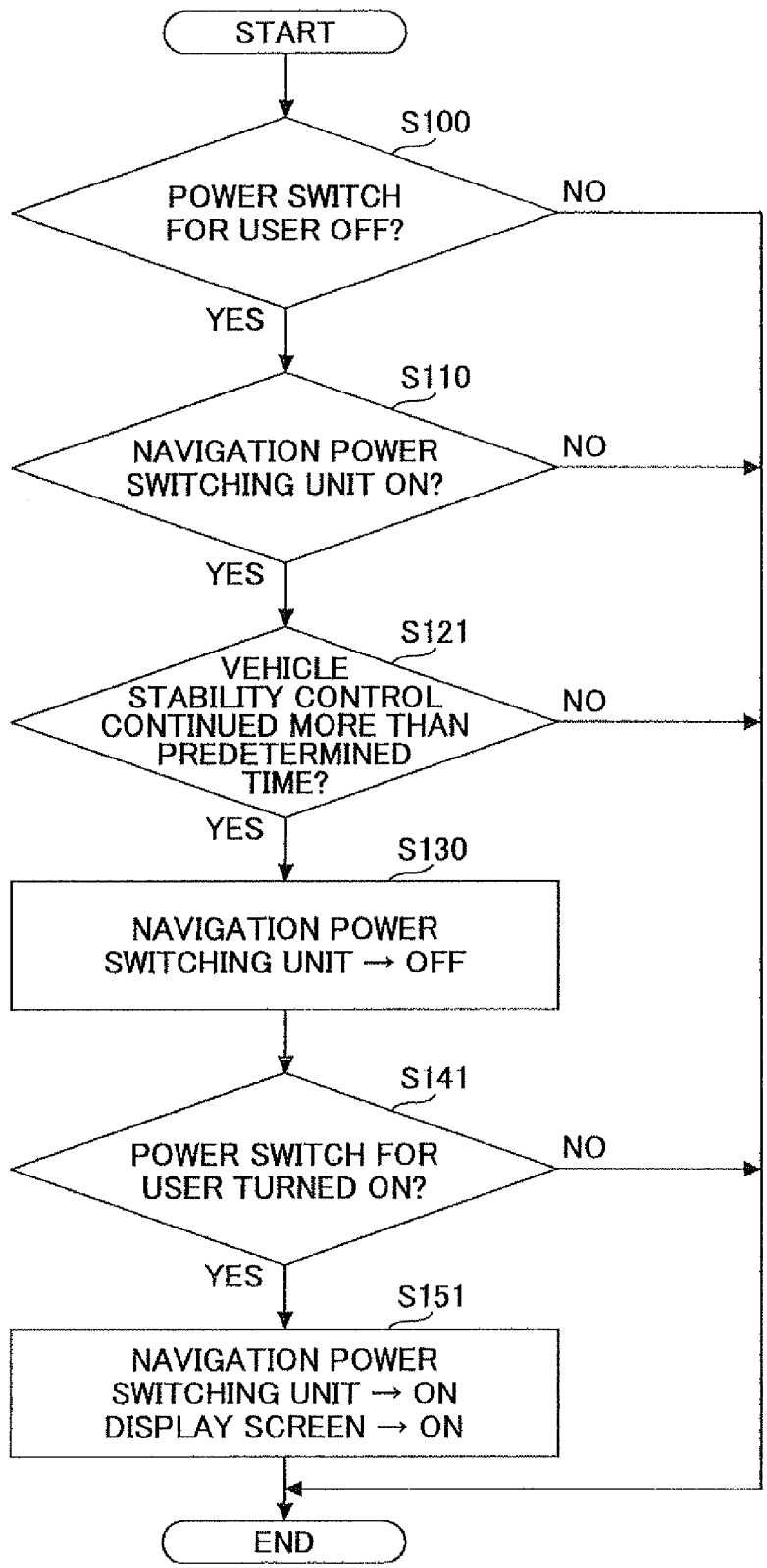
FIG. 5 is a processing flow diagram of the power supply control apparatus of the navigation system of the second embodiment.

Next, a description is given about a processing flow of the power supply control apparatus of the navigation system 10 in the second embodiment by using FIG. 5. FIG. 5 is a diagram showing an example of the power supply control apparatus of the navigation system 10 in the second embodiment. Here, in FIG. 5, the same process numbers are used for processes similar to the process shown in FIG. 3 that shows a processing flow of the power supply control apparatus of the navigation system 10 in the first embodiment, and the explanations are omitted or simplified.

In Step S100, the power supply control unit 60 determines whether the power switch 20 for a user is off. Since this step is similar to Step 100 in FIG. 3, the explanation is omitted.

In Step 110, the power supply control unit 60 determines whether the navigation power switching unit is in the on state. Since this step is similar to Step 110 in FIG. 3, the explanation is omitted.

In Step 121, the power supply control unit 60 determines whether the vehicle stability control continues more than or equal to the predetermined time. Whether the vehicle stability control continues more than or equal to the predetermined time may be detected by the vehicle stability control continuous operation detecting unit 55. For example, while the vehicle stability control is working, the vehicle stability control operation signal detecting unit 56 detects the signal indicating that the vehicle stability control is working, and the timer 57 measures whether the operation signal that the vehicle stability control operation signal detecting unit 56 has detected continues more than or equal to the predetermined time. If the operation signal is continuously detected more than or equal to the predetermined time, the vehicle stability control operation signal detecting unit 56 outputs the navigation information unnecessary state signal that indicates the state where the navigation information is unnecessary to the power supply control unit 60. The power supply control unit 60 can determine that the vehicle stability control continues more than or equal to the predetermined time by receiving the navigation information unnecessary state. On the other hand, if no signal is detected from the vehicle stability control operation signal detecting unit 56, the power supply control unit 60 determines that the vehicle stability control does not continue more than or equal to the predetermined time.

Here, as described in FIG. 4, it may be possible that the power supply control unit 60 includes the timer 61, receives the operation detecting signal transmitted from the vehicle stability control operation signal detecting unit 56 and determines whether the operation detecting signal continues more than or equal to the predetermined time.

In Step 121, if the power supply control unit 60 determines that the vehicle stability control does not continue more than or equal to the predetermined time, and determines that the user is not in the navigation information unnecessary state, the processing flow finishes and then the processing flow is repeated from the beginning. In contrast, if the power supply control unit 60 determines that the vehicle stability control continues more than or equal to the predetermined time and the user is in the navigation information unnecessary state, the process proceeds to Step S130.

In Step S130, the power supply control unit 60 executes control that turns the navigation power switching unit 30 off. This causes the battery 40 connected to the navigation system 10 to be disconnected, and the navigation system 10 completely turns off. Here, since this step is similar to the explanation about the processing flow of the first embodiment, the detailed explanation is omitted.

In Step S141, the power supply control unit 60 determines whether there is an on operation for the power switch 20 for a user of the navigation system 10. In other words, it is determined whether there is a return operation of the navigation system 10 by the user. The power supply control unit 60 monitors and determines whether the power switching unit 22 for a user that works with the power switch 20 for a user enters the on state, by which whether the power switch 20 for a user enters the on state may be determined.

If there is no on operation for the power switch 20 for a user, the processing flow finishes, and the complete power supply off state including the internal function of the navigation system 10 continues. Then, the processing flow is repeated from the beginning, and the process enters a standby state where a processing flow from Start to End by way of Step 141 is complemented and repeated. On the other hand, if the power supply control unit 60 determines that there is an on operation for the power switch 20 for a user, the process advances to Step 151.

In Step 151, the power supply control unit 60 carries out the power supply control that switches the navigation power switching unit 30 from off to on, and the navigation system 10 returns to the on state. On the display screen 11 of the navigation system 10, the map information is displayed. Because the return operation in the case is from the complete off state of the navigation system, the return operation similar to a start operation of the navigation system 10 when the engine 89 starts is performed.

By the complete return of the navigation system 10, the processing flow finishes once, and then the processing flow is repeated from the beginning.

In this manner, the power supply control apparatus of the navigation system 10 in the embodiment 2 determines whether the user needs the navigation information from the operation state of the vehicle stability control. Then, if the power supply control apparatus of the navigation system 10 determines that the navigation information is unnecessary for the user, the power supply control apparatus of the navigation system 10 turns off the power supply for the navigation system 10, which can save the electric power and improve the gasoline mileage. Thus, even when the vehicle is in motion, by turning off the power supply for the navigation system 10 when the navigation information is unnecessary, it is possible to save the electric power and to improve the power consumption efficiency and the gasoline mileage in a short amount of time.

Third Embodiment

Figure 6:
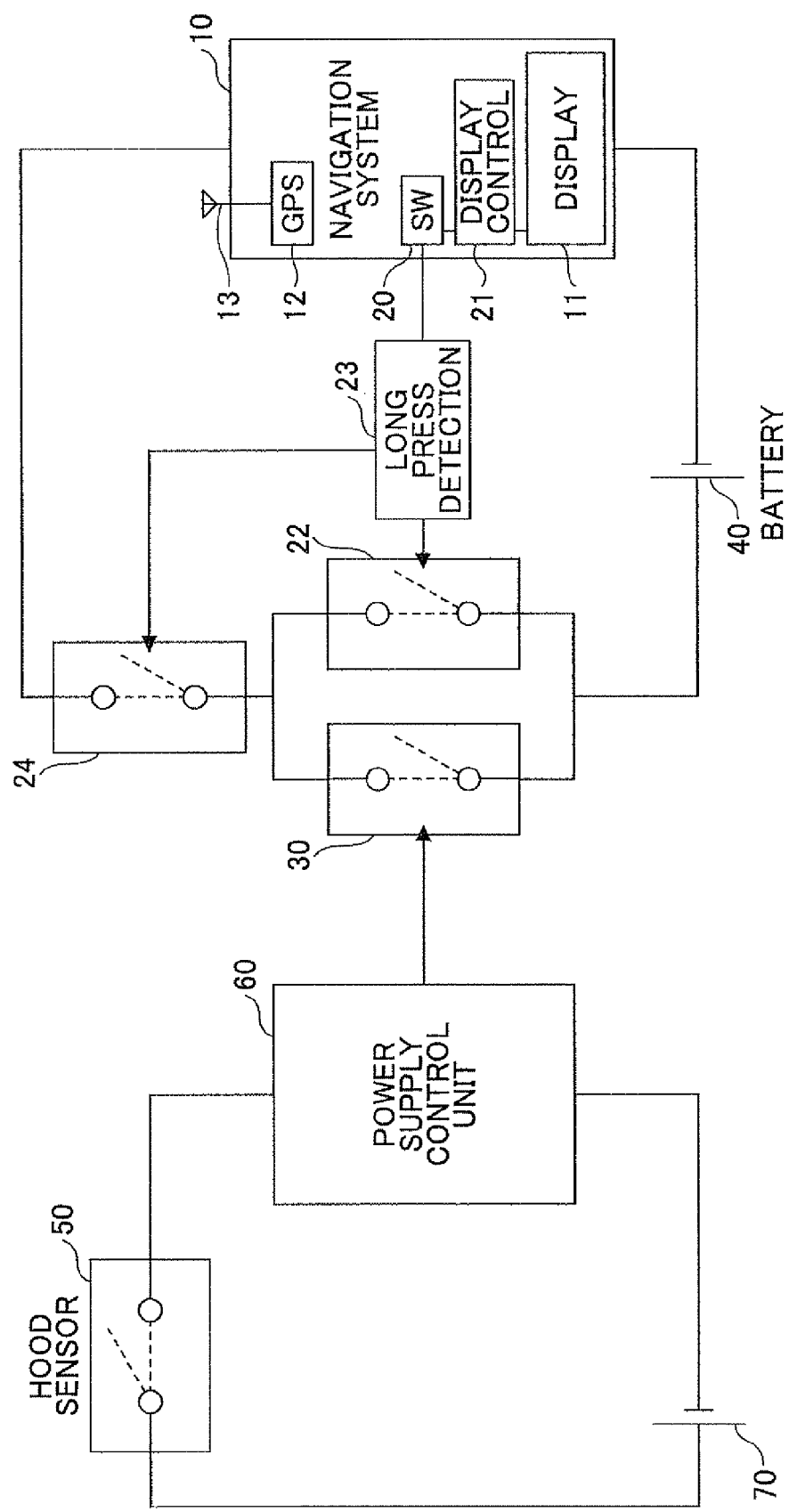
FIG. 6 is an overall diagram showing an example of a power supply control apparatus of a navigation system of a third embodiment of the present invention.

FIG. 6 is a diagram showing an example of an overall configuration of a power supply control apparatus of a navigation system 10 of a third embodiment. In FIG. 6, the power supply control apparatus of the navigation system 10 of the third embodiment is common to the power supply apparatus of the navigation system 10 of the first embodiment in that the power supply control apparatus of the navigation system 10 of the third embodiment includes a navigation system 10, a power switch 20 for a user, a power switching unit 22 for a user, a navigation power switching unit 30, a battery 40, an engine hood sensor 50, a power supply control unit 60 and a power supply 70. Moreover, the power supply control apparatus of the navigation system 10 of the third embodiment is common to the power supply control apparatus of the navigation system 10 of the first embodiment in that the navigation system 10 includes a display screen 11, a GPS receiver 12, a power switch 20 for a user and a display control unit 21.

The power supply control apparatus of the navigation system 10 of the third embodiment differs from the power supply control apparatus of the navigation system 10 of the first embodiment in that the power supply control apparatus of the navigation system 10 further includes a long press detecting unit 23 and a whole power switching unit 24.

The long press detecting unit 23 detects a long press of an off operation on the power switch 20 for a user, and is provided connected to the power switch 20 for a user. The long press of the power switch 20 for a user means where the user continues to press the power switch 20 for a user more than or equal to a predetermined time. Hence, the long press detecting unit 23 detects that the user presses the power switch 20 for a user for a long time when the power switch 20 for a user is pressed more than or equal to the predetermined time. The long press detecting unit 23 detects the long press of the power switch 20 for a user, by which it is possible to make the power supply control apparatus of the navigation system 10 perform a different operation from one when the user presses the power switch 20 for a user in a short time. Here, a predetermined time, which becomes a reference time for determination of the long press, can be set depending on an intended purpose. For example, the predetermined time may be set at a time length of three to five seconds.

The whole power switching unit 24 is a power supply connection switching unit to completely turn off the power delivery for the navigation system 10. The power switching unit 22 for a user and the navigation power switching unit 30 are in parallel connection where if either of the power switching unit 22 for a user or the navigation power switching unit 30 is on, the power delivery for the navigation system 10 is performed. In contrast, the whole power switching unit 24 is serially inserted in a power delivery path so that the whole power switching unit 24 can switch the on/off of the power delivery for the navigation system 10 by own on/off switching.

In this way, the whole power switching unit 24 can turn off the power delivery for the navigation system 10 even if the power switching unit 22 for a user or the navigation power switching unit 30 is in the on state and the power delivery is performed for the navigation system 10, regardless of the on state of the power switching unit 22 for a user and the navigation power switching unit 30. Here, various kinds of switching units are available for the whole power switching unit 24. For example, a relay can be used for the whole power switching unit 24.

The long press detecting unit 23 turns the whole power switching unit 24 off by outputting an off signal to the whole power switching unit 24, and completely turns off the power supply of the navigation system 10 when the long press detecting unit 23 detects a long press of an off-operation for the power switch 20 for a user. In contrast, when the power switch 20 for a user is turned off, if the long press detection is less than the predetermined time, the long press detecting unit 23 turns the power switch 20 for a user off as well as the case of the first embodiment. Here, when the long press detecting unit 23 may turn only the whole power switching unit 24 off or both of the whole power switching unit 24 and the power switching unit 22 for a user off.

The long press detecting unit 23 may be configured as an electronic control unit that has an operational processing function that outputs a command signal to the whole power switching unit 24 when detecting the long press, or a unit that has a simple switch function that outputs a degree of voltage that can switch the whole power switching unit 24 and applies the voltage to the whole power switching unit 24.

The power supply control apparatus of the navigation system 10 of the third embodiment can have a function to completely turn the power supply of the navigation system 10 off by user's intention by further including the long press detecting unit 23 and the whole power switching unit 24 and by performing the above-mentioned operation.

Besides, the power supply control apparatus of the navigation system 10 of the third embodiment includes the components of the power supply control apparatus of the navigation system of the first embodiment, and can perform the power supply control to save the electric power described in the first embodiment. More specifically, while the engine is operating, when the power switch 20 for a user of the navigation system 10 is off and the display screen 11 is in the off state, if the engine hood is opened, the navigation power switching 30 is turned off and the power delivery to the navigation system 10 is turned off. Furthermore, regardless of such a state, even when the power switch for a user is in the on state and the navigation system 10 is working, displaying the map information on the display screen 11, if the user presses the power switch 20 for a user more than or equal to the predetermined time, the long press detecting unit 23 detects the long press, turns the whole power switching unit 24 off and completely turns off the power delivery for the navigation system 10.

This allows the user to completely turn off the navigation system 10 based on the user's intention, other than the automatic power supply control by using the engine hood sensor 50, by which the user himself can save the electric power and improve the gasoline mileage. In this respect, the power supply apparatus of the navigation system 10 of the third embodiment contrasts strongly with the conventional navigation system 10 that does not include such a switch that the user can completely turn off the navigation system 10, from the viewpoint of emphasizing responsiveness. The power supply apparatus of the navigation system 10 of the third embodiment is configured to be able to completely turn off the navigation system 10, if the user thinks the navigation information unnecessary.

Here, if the user switches the power switch 20 for a user from off to on, it is only necessary to perform a returning operation by performing an inverse operation to the switching operation into the complete off state the long press detecting unit 23 carries out when detecting the long press. More specifically, if the long press detecting unit 23 has executed the switching operation that has turned off only the whole power switching unit 24, it is only necessary to turn on the whole power switching unit 24 for the returning operation of the navigation system 10. Because the power switching unit 22 is in the on state before the power switching unit 20 is turned off by the long press, and the whole switching unit 24 is turned off, leaving the power switching unit 22 on after the long press detection; by turning the whole power switching unit 24 on, the navigation system 10 can be turned on and be restarted. On the other hand, when the long press detecting unit 23 detects the off operation long press, if the long press detecting unit 23 has turned off both of the whole power switching unit 24 and the power switch 20 for a user, the navigation system 10 can return to the original operational state and restart by turning both of the whole power switching unit 24 and the power switch 20 for a user when the power switch is turned on.

Fourth Embodiment

Figure 7:
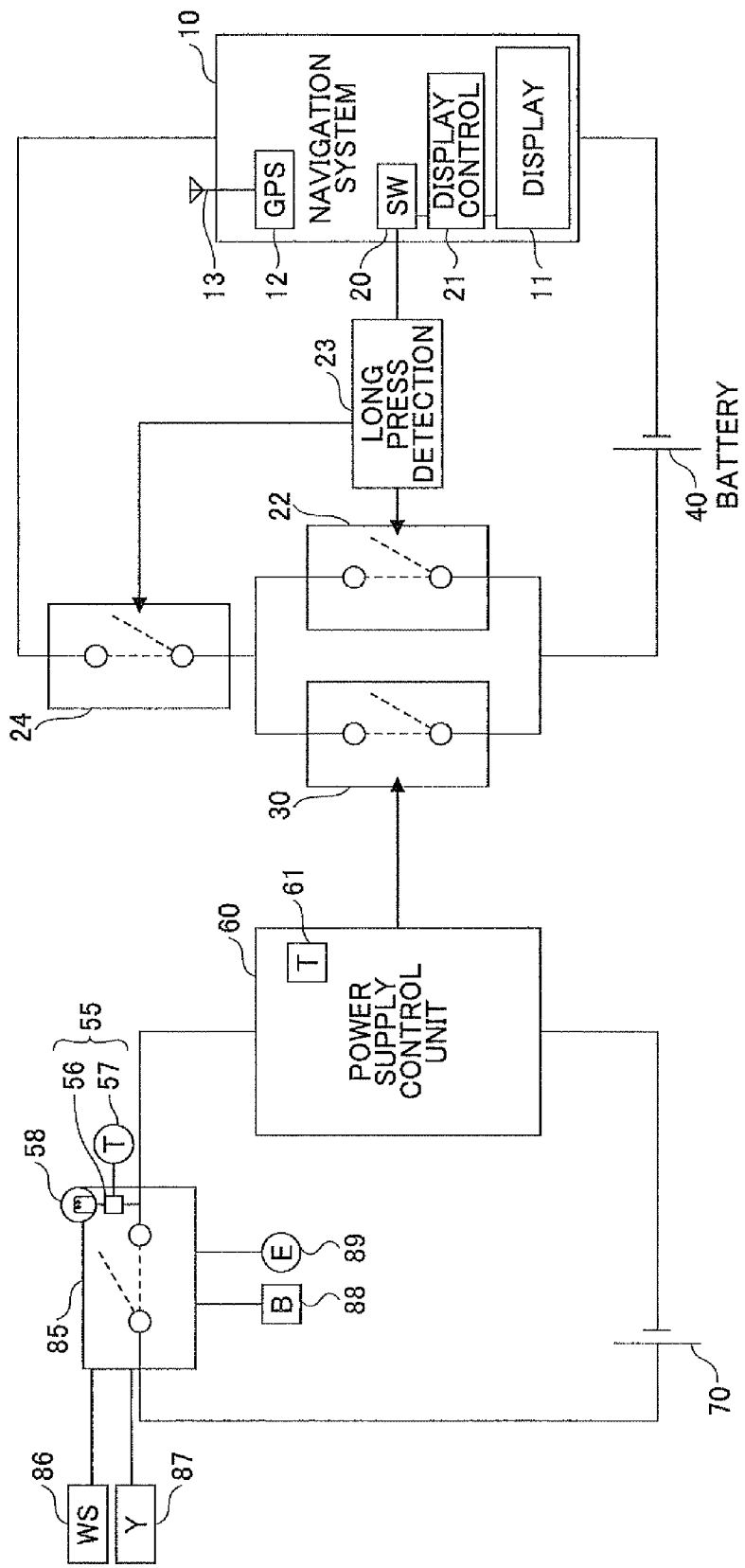
FIG. 7 is an overall configuration diagram showing an example of a power supply control apparatus of a navigation system of a fourth embodiment of the present invention.

FIG. 7 is a diagram showing an example of an overall configuration of a power supply control apparatus of a navigation system 10 of a fourth embodiment. The power supply control apparatus of the navigation system 10 of the fourth embodiment is a combined embodiment where a long press whole power switching function described in the power supply apparatus of navigation system 10 of the third embodiment is added to the power supply control apparatus of the navigation system of the second embodiment.

Accordingly, the power supply control apparatus of the navigation system 10 of the fourth embodiment is common to that of the second embodiment in that the power supply control apparatus of the navigation system 10 of the fourth embodiment includes a navigation system 10, a power switch 20 for a user, a power switching unit 22 for a user, a navigation power switching unit 30, a battery 40, a vehicle stability control operation detecting unit 55, a lamp 58, a power supply control unit 60, a power supply 70 and a vehicle stability control unit 85. Also, the power supply control apparatus of the navigation system 10 of the fourth embodiment is common to that of the second embodiment in that the navigation system 10 includes a display screen 11, a GPS receiver 12, a power switch 20 for a user, a display control unit 21, and that the vehicle stability control continuous operation detecting unit 55 includes a vehicle stability control operation detecting unit 56 and a timer 57. Furthermore, the power supply control apparatus of the navigation system 10 of the fourth embodiment is also common to that of the second embodiment in that a wheel speed sensor 86, a yaw rate sensor 87, a brake 88 and engine 89 may be provided as related components. Moreover, the power supply control apparatus of the navigation system 10 of the fourth embodiment is similar to that of the second embodiment in that a timer 61 may be provided inside the power supply control unit 60 instead of the timer 57. The same numerals as those in FIG. 4 are used for these components similar to those of the power supply control apparatus of the navigation system 10 of the second embodiment, and the explanation is omitted about the components.

The power supply control apparatus of the navigation system 10 of the fourth embodiment differs from that of the second embodiment in that the power supply control apparatus of the navigation system 10 of the fourth embodiment includes a long press detecting unit 23 and a whole power switching unit 24.

Since the long press detecting unit 23 is similar to a unit described in the power supply control apparatus of the navigation system 10 of the third embodiment, the same numerals are used for that and the explanation is omitted.

An operation in a time when the user carries out an off-operation by pressing the power switch 20 for a user more than or equal to a predetermined time is also similar to that of the power supply control apparatus of the third embodiment, and an operation in a case where the navigation system 10 restarts by returning to an original state is also similar to that of the power supply control apparatus of the navigation system 10 of the third embodiment. Hence, detailed explanations about these operations are omitted.

According to the power supply control apparatus of the navigation system 10 of the fourth embodiment, it is possible to completely turn the navigation system 10 off by user's intention and to improve the efficiency of power consumption and gasoline mileage, by adding a function that turns off the navigation system 10 including the internal function when the vehicle stability control continuously works for more than or equal to the predetermined time where the power switch 20 for a user is off. The power supply control apparatus of the navigation system 10 of the fourth embodiment is configured not only to perform control that turns off the power supply for the navigation system 10 while the vehicle stability control is continuously working, which means a navigation information unnecessary state for a user, as well as the power supply control apparatus of the navigation system 10 of the third embodiment, but also to be able to completely turn the power supply off by user's intention. Therefore, the power supply control apparatus of the navigation system 10 of the fourth embodiment can save electric power and improve the gasoline mileage from both aspects of control and an operation, which can provide a great advantage for the user.

Figure 8:
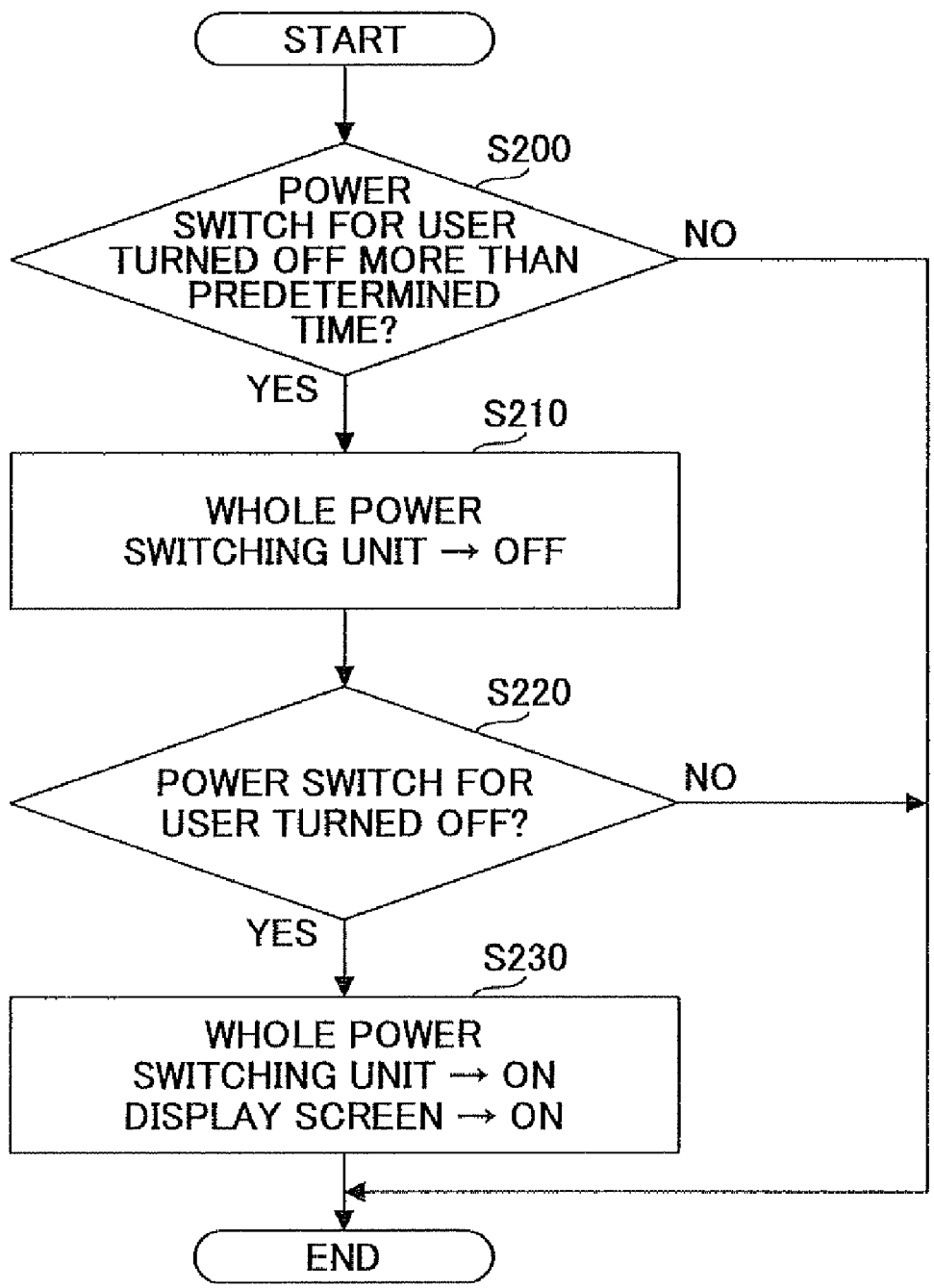
FIG. 8 is a processing flow diagram of the power supply control apparatus of the navigation system of the third and fourth embodiment in a turning off operation by a long press.

Next, by using FIG. 8, an explanation is given about a processing flow of the power supply control apparatus of the navigation system 10 of the third and fourth embodiments when the user carries out a power off operation by a long press. FIG. 8 is a diagram showing a processing flow in a long press off operation of the power supply control apparatus of the navigation system 10 of the third and fourth embodiments.

In Step S200, the long press detecting unit 23 determines whether there is an off operation of the power switch 20 for a user for more than or equal to the predetermined time, that is, existence or nonexistence of the long press. The existence or nonexistence of the long press may be determined by whether the power switch 20 for a user is turned off for more than or equal to the predetermined time of the long press reference time.

In Step S200, if the long press detecting unit 23 determines that there is no long pressing off operation, the processing flow finishes and repeats from the beginning, and enters a standby state in Step S200. On the other hand, if the long press detecting unit 23 determines that there is a long pressing off operation, the process advances to Step 210.

In Step S210, the long press detecting unit 23 outputs a signal to turn the whole power switching unit 24 off, and the whole power switching unit 24 switches from on to off. This completely turns off the power supply for the navigation system 10 including the internal function, not just the display screen 11.

In Step S220, whether there is an on operation of the power switch 20 for a user is detected. If there is no on operation of the power switch 20 for a user, the processing flow finishes once. Then, the processing flow is repeated from the beginning, and the process becomes a substantial standby state. In contrast, the on operation of the power switch 20 for a user is detected, the process proceeds to Step S230.

In Step S230, the whole power switching unit 24 turns on, the electric power is provided for the navigation system 10, and the navigation system 10 restarts and returns to the on state. In this case, if the power switching unit 22 for a user has been turned off in Step S210, the power switching unit 22 also returns to the on state. On the other hand, if the power switching unit 22 for a user had been kept on state in Step S210, it is enough to turn only the whole power switching unit 24 on.

In addition, by the operation of the power switch 20 for a user, the display screen control unit 21 begins to work, and the display screen 11 returns to the on state. This returns to where the navigation system 10 can provide the map information for the user. Then, the processing flow of FIG. 8 finishes. After that, the processing flow is repeated from the beginning.

Here, the processing flow shown in FIG. 8 may be implemented in parallel with the processing flow of FIG. 3 described in the first embodiment or the processing flow of FIG. 5 described in the second embodiment. The processing flow described in FIG. 8 is performed where the power switch 20 for a user is in the on state and the display screen 11 is in the on state. In contrast, the processing flow of FIG. 3 and FIG. 5 are executed where the power switch 20 for a user is in the off state and the display screen 11 is in the off state. Therefore, the processing flow shown in FIG. 8 does not contradict the processing flows shown in FIG. 3 and FIG. 5.

Consequently, the power supply control apparatus of the navigation system 10 of the third and fourth embodiments can balance the power supply control by the detection of the navigation information unnecessary state and the power supply operation by user's intention without any problems.

Moreover, because the navigation information unnecessary states of the first and the second embodiments are detected with respect to different states of the vehicle and the user, both of the functions in the first and the second embodiment can be incorporated in one power supply control apparatus of the navigation system 10. Therefore, the power supply control apparatus of the navigation system 10 can be configured by combining the first embodiment through the fourth embodiment.

Furthermore, the example of using the engine hood sensor 50 as the navigation information unnecessary detecting unit is explained in the first embodiment, and the example of using the vehicle stability control continuous operation detecting unit 55 as the navigation information unnecessary detecting unit is explained in the second embodiment. However, a variety of vehicle states can be thought to express the navigation information unnecessary state for the user. Therefore, it may be possible to configure the navigation information unnecessary state detecting unit as other embodiments than the embodiments using the engine hood sensor 50 or the vehicle stability control continuous operation detecting unit 55, and to set various navigation information unnecessary states by using various detecting units. With this, it is possible to make a power supply control apparatus of the navigation system 10 capable of electric power savings and improvement of fuel economy in a further range. The present invention is applicable for such various embodiments of the power supply control apparatus of the navigation system 10.

Fifth Embodiment

Figure 9:
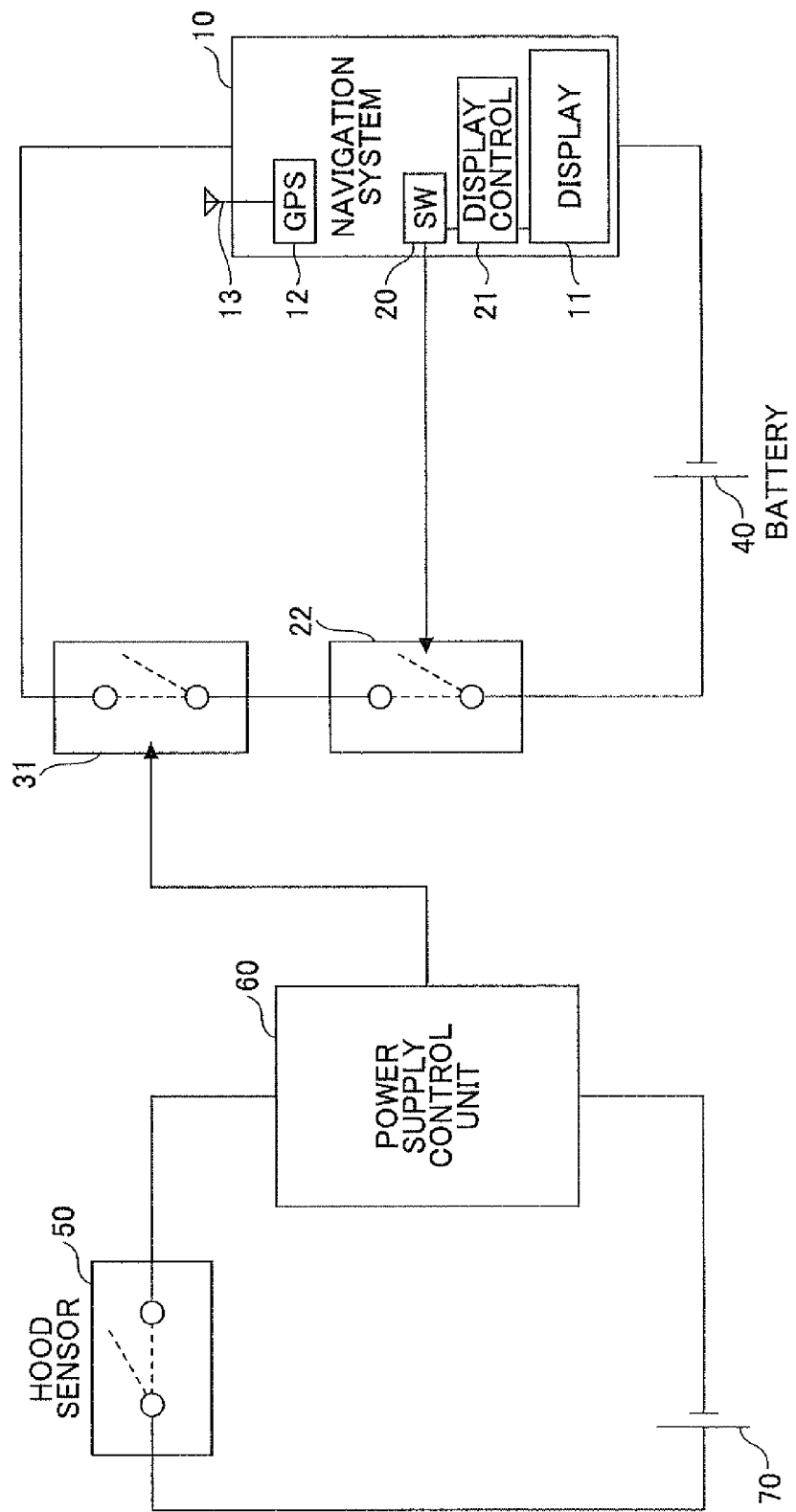
FIG. 9 is an overall configuration diagram showing an example of a power supply control apparatus of a navigation system of a fifth embodiment of the present invention.

FIG. 9 is an overall configuration diagram showing an example of a power supply control apparatus of a navigation system of a fifth embodiment. In the power supply control apparatus of the navigation system of the fifth embodiment, the same numerals are used for components similar to those in the first embodiment through fourth embodiment, and descriptions of the components may be omitted or simplified.

The power supply control apparatus of the navigation system 10 of the fifth embodiment includes a navigation system 10, a power switch 20 for a user, a power switching unit 22 for a user, a navigation power switching unit 31, a battery 40, an engine hood sensor 50, a power supply control unit 60 and a power supply 70. The power supply control apparatus of the navigation system 10 of the fifth embodiment differs from that of the first embodiment in that the navigation power switching unit 31 is connected in series to the power switching control unit 22 for a user. According to such a configuration, if the navigation power switching unit 31 is turned off, power from the battery 40 to the navigation system 10 is completely stopped without depending on an on/off state of the power switching unit 22 for a user.

The power supply control unit 60 controls the on/off state of the navigation power switching unit 31, based on output of the engine hood sensor 50. More specifically, when the engine hood sensor 50 detects an open state of the engine hood of a vehicle, the power supply control unit 60 determines that the vehicle is in a navigation information unnecessary state, and then turns off the navigation power switching unit 31. The navigation power switching unit 31 is usually turned on as long as the engine hood sensor 50 does not detect the engine hood opening state, which is the navigation information unnecessary state.

In the configuration, when the engine hood sensor 50 detects the engine hood opening state, the power supply control unit 60 turns off the navigation power switching unit 31, by which power for the entire navigation system 10 can be shut off even if the power switching unit 22 for a user is turned on. As described in the first embodiment, when the engine hood 80 is open, it is thought that someone is checking the engine, without running the vehicle. Hence, it is thought that the navigation information is unnecessary even if the display screen 11 of the navigation system has been turned on, when the engine hood 80 is open. Therefore, the power supply control apparatus of a navigation system 10 of a fifth embodiment is configured to turn off the navigation power switching unit 31 and completely turn off the navigation system 10 including its internal function, regardless of the power supply state of the navigation system 10, when the engine hood sensor 50 detects the engine hood opening state.

According to the power supply control apparatus of the navigation system 10 in the fifth embodiment, it is possible not to use the electric power for the navigation system 10 when the vehicle is in a navigation information unnecessary state, without depending on the power supply state of the navigation system 10.

Also, if the engine hood sensor 50 detects closing of the engine hood 80 after first detecting the opening of the engine hood 80, the power supply control unit 60 turns on the navigation power switching unit 31 and returns the power delivery for the navigation system 10 to normal.

Figure 10:
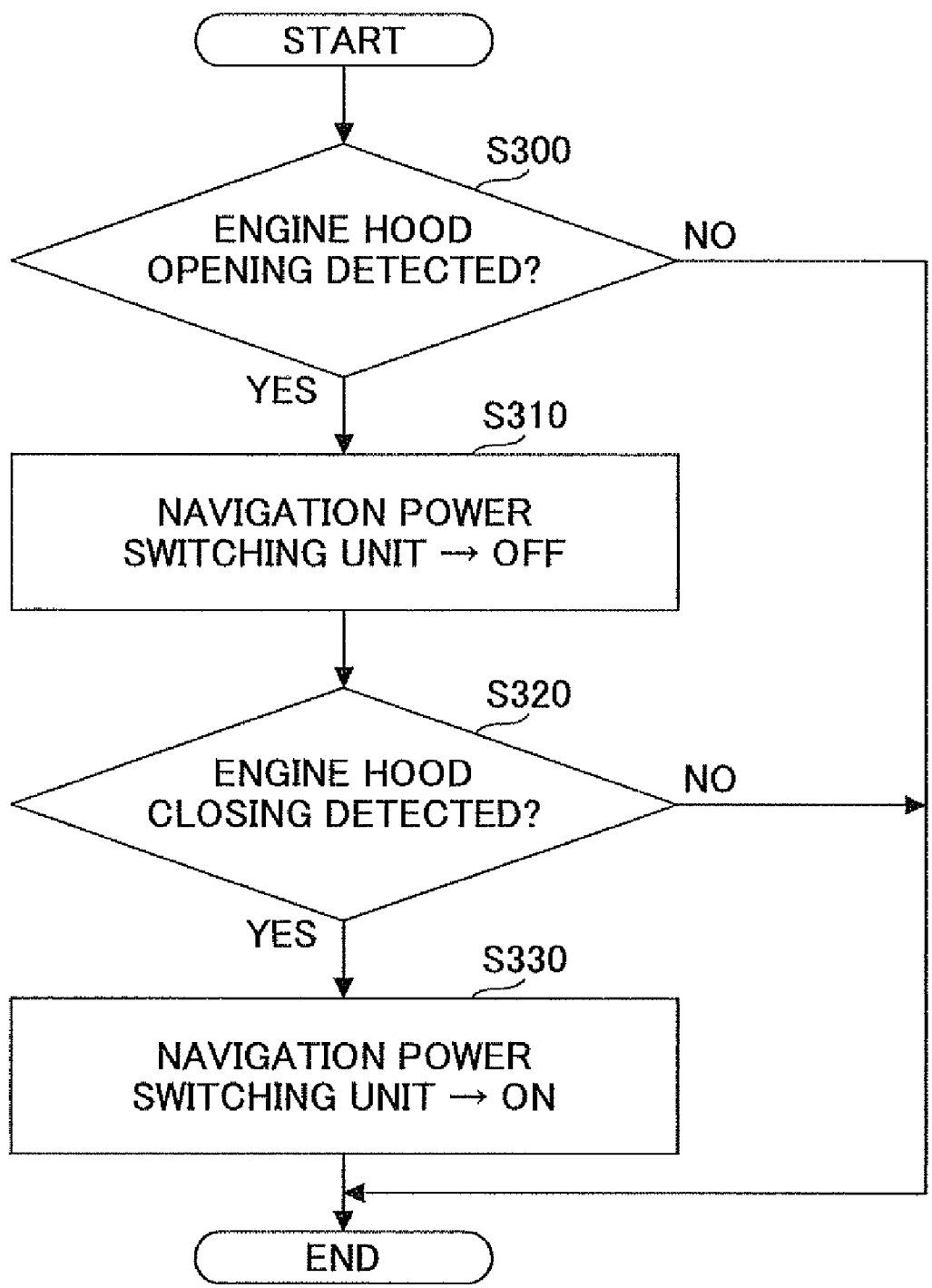
FIG. 10 is a processing flow diagram of the power supply control apparatus of the navigation system 10 of the fifth embodiment.

FIG. 10 is a processing flow diagram of the power supply control apparatus of the navigation system 10 of the fifth embodiment.

In Step S300 of FIG. 10, it is determined whether the engine hood sensor 50 detects the engine hood opening state. When the engine hood sensor 50 detects the engine hood opening state, the output signal is input into the power supply control unit 60.

If the engine hood sensor 50 detects the opening of the engine hood 80 in Step S300, the process advances to Step S310. On the other hand, if the engine hood sensor 50 does not detect the engine hood opening state or detects the engine hood closing state, the process ends and repeats the process flow from the beginning.

In Step S310, the power supply control unit 60 turns off the navigation power switching unit 31. With this, the navigation system 10 is completely turned off. After performing Step S310, the process advances to Step S320.

In Step S320, it is determined whether the engine hood sensor 50 detects the engine hood closing state. When the engine hood sensor 50 detects the engine hood closing state, the output signal is input into the power supply control unit 60.

If the engine hood sensor 50 detects closing of the engine hood 80 in Step S320, the process advances to Step S330. In contrast, if the engine hood sensor 50 does not detect closing of the engine hood 80 or detects opening of the engine hood 80, the process ends then starts the process flow again from the beginning.

In Step S330, the power supply control unit 60 turns on the navigation power switching unit 31. By doing this, the power delivery for the navigation system 10 depends on the power switching unit 22 for a user. More specifically, the navigation system 10 is turned on if a user turns on the power switch 20 for a user, and the navigation system 10 is turned off if the user turns off the power switch 20 for a user.

After performing Step S330, the processing flow ends once and starts from the beginning repeatedly.

In this way, according to the power supply control apparatus of the navigation system 10, it is possible not to use the electric power for the navigation system 10 by shutting off the power for the navigation system 10 whenever the engine hood opening state is detected.

Sixth Embodiment

Figure 11:
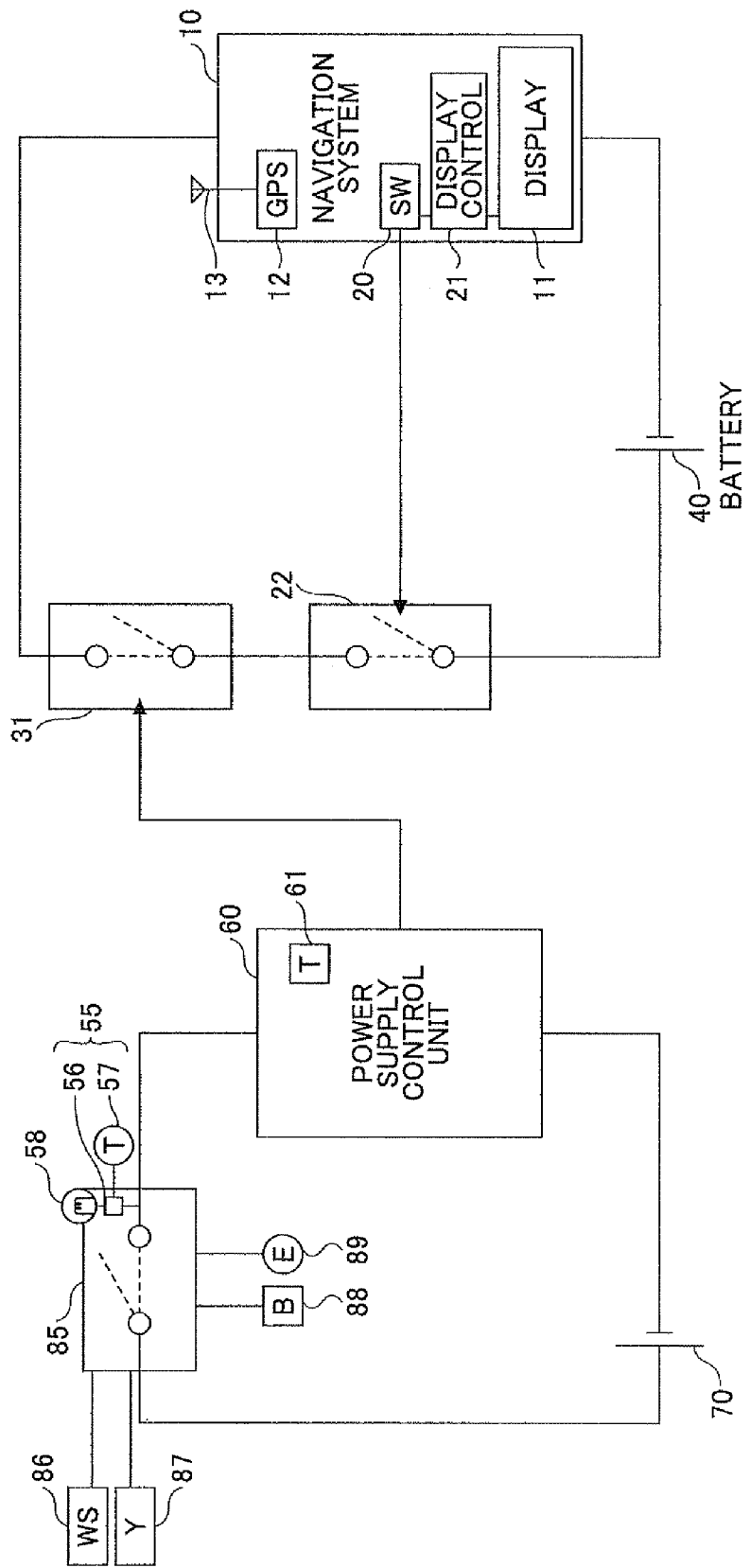
FIG. 11 is an overall configuration diagram showing an example of a power supply control apparatus of a navigation system of a sixth embodiment of the present invention.

FIG. 11 is an overall configuration diagram showing an example of a power supply control apparatus of a navigation system of a sixth embodiment. In FIG. 11, the power supply control apparatus of the navigation system 10 of the sixth embodiment includes components similar to those of the second embodiment shown in FIG. 4, except a navigation power switching unit 31. The same numerals are used for the components similar to those of the second embodiment, and descriptions of the components similar to those of the second embodiment may be omitted or simplified. The power supply apparatus of the navigation system 10 of the sixth embodiment differs from that of the second embodiment in that the navigation power switching unit 30 of the second embodiment is replaced by the navigation power switching unit 31 that is connected in series to the power switching unit 22 for a user.

In the power supply control apparatus of the navigation system 10 of the second embodiment, the power switching unit 30 is connected in parallel to the power switching unit 22 for a user. However, in the power supply control apparatus of the navigation system 10 of the sixth embodiment, the navigation power switching unit 31 is inserted between the navigation system 10 and the power switching unit 22 for a user, and connected in series to the power switching unit 22 for a user. With this configuration, if the navigation power switching unit 31 is turned off, electric power supply for the navigation system 10 is completely shut off.

The power supply control apparatus of the navigation system 10 of the sixth embodiment includes a vehicle stability control unit 85, and a vehicle stability control continuous operation detecting unit 55 as a navigation information unnecessary detecting unit as well as that of the second embodiment.

Moreover, the power supply control apparatus of the navigation system 10 of the sixth embodiment determines whether a user does not need the navigation information, based on an operating condition of the vehicle stability control unit 85. As described in the second embodiment, the vehicle stability control unit 85 performs vehicle stability control when the vehicle is in an unstable state, and it is desired for the vehicle to be controlled to enter a stable state. Under the emergency circumstances, the user would not need navigation information such as map information because there is no time for any activity but driving.

Therefore, in the power supply control apparatus of the navigation system 10 of the sixth embodiment, if the vehicle stability control continuous operation detecting unit 55 detects that a vehicle stability control continuous operating state continues for more than or equal to a predetermined continuous time, which is a navigation information unnecessary state, the power supply control unit 60 turns off the navigation power switching unit 31 and completely shuts off the power for the navigation system 10, despite a power supply state of the navigation system 10. In other words, even if the display screen 11 is turned on, the navigation system 10 is completely turned off when the navigation information unnecessary state is detected. Here, the vehicle stability control continuous operation detecting unit 55 detects a vehicle stability control duration time by using a vehicle stability control operation signal detecting unit 56 and a timer 57.

According to the power supply control apparatus of the navigation system 10, it is possible to consume electric power for the navigation system 10 more efficiently because the power supply for the navigation system 10 is completely turned off even for a short time when the navigation information is thought to be unnecessary for the user.

FIG. 12 is a processing flow diagram of the power supply control apparatus of the navigation system 10 of the sixth embodiment.

In Step S400, it is determined whether the vehicle stability control by the vehicle stability control unit 85 continues for more than or equal to a predetermined time. More specifically, the vehicle stability control continuous operation detecting unit 55 detects whether the vehicle stability control operates for more than or equal to the predetermined time by using the vehicle stability control operation signal detecting unit 56 and the timer 57.

In Step S400, if the vehicle stability control continuous operation detecting unit 55 detects that the vehicle stability control operates more than or equal to the predetermined time, the process advances to Step S410. On the other hand, if the vehicle stability control continuous operation detecting unit 55 does not detect that the vehicle stability control operates for more than or equal to the predetermined time, the processing flow first ends then starts again from the beginning.

In Step S410, the power supply control unit 60 turns off the navigation power switching unit 31. By doing this, the electric power for the navigation system 10 is completely turned off, without depending on a power supply state of the navigation system 10. After performing the process of Step S410, the process proceeds to Step S420.

In Step 420, it is determined whether the vehicle stability control continues or stops. If the vehicle stability control continuous operation detecting unit 55 does not detect the continuous vehicle stability control operation, it is determined that the vehicle stability control has stopped. In this case, the process advances to Step S430. In contrast, if the vehicle stability control continuous operation detecting unit 55 continuously detects the vehicle stability control operation, the process enters a waiting state, repeatedly circulating at Step S420.

In Step S430, the navigation power control unit 60 turns off the navigation power switching unit 31. By doing this, the navigation system 10 returns to a state before performing Step S410. If the display screen 11 of the navigation system 10 has been turned on before performing Step S410, the display screen 11 shows the navigation information again. Meanwhile, if the display screen 11 of the navigation system 10 has been turned off before performing Step S410, the internal function of the navigation system 10 works again and is ready to show the navigation information on the display screen 11 when the power switch 20 for a user is turned on by a user.

After performing the process of Step S430, the processing flow first ends then starts from the beginning.

In this way, according to the power supply control apparatus of the navigation system 10 of the sixth embodiment, it is possible not to use the electric power for the navigation system 10, by turning off the navigation power switching unit 31 connected in series to the power switching unit 22 for a user, and by completely shutting off the power for the navigation system 10 when the vehicle stability control continues to operate for more than or equal to the predetermined time, without depending on the power supplying state of the navigation system 10.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present invention have been described in detail, it should be understood that the various changes, substitutions, and alterations could be made hereto without departing from the spirit and scope of the invention.

What is claimed is:

1. A power supply control apparatus of a navigation system comprising:
    a power switch for a user to turn a display screen of the navigation system on or off;
    a navigation power switching unit to turn an internal function of the navigation system on or off by a power supply connection;
    a navigation information unnecessary state detecting unit to detect a navigation information unnecessary state where a user does not need navigation information; and
    a power supply control unit to turn the navigation power switching unit off when the navigation information unnecessary state detecting unit detects the navigation information unnecessary state, if the power switch for a user is turned off and the navigation power switching unit is turned on,
    wherein the navigation information unnecessary state detecting unit includes an engine hood sensor, and
    the navigation information unnecessary state includes a state where the engine hood sensor detects that the engine hood is open.

2. The power supply control apparatus of the navigation system as claimed in claim 1,
    wherein the power supply control unit turns the navigation power switching unit on when the engine hood sensor detects that the engine hood is closed after turning the navigation power switching unit off.

3. The power supply control apparatus of the navigation system as claimed in claim 1,
    wherein the navigation information unnecessary state detecting unit includes a vehicle stability control operation signal detecting unit to detect an operation signal indicating a vehicle stability control to ensure a vehicle stability by controlling a hydraulic pressure of a brake and an engine output is working, and
    the navigation information unnecessary state is where the vehicle stability control operation signal detecting unit continues to detect the operation signal for more than or equal to a predetermined time.

4. The power supply control apparatus of the navigation system as claimed in claim 3,
    wherein the power supply control unit turns the navigation power switching unit on when the power supply switch for a user is turned on after turning the navigation power switching unit off.

5. The power supply control apparatus of the navigation system as claimed in claim 2,
    wherein the navigation information unnecessary state detecting unit includes a vehicle stability control operation signal detecting unit to detect an operation signal indicating a vehicle stability control to ensure a vehicle stability by controlling a hydraulic pressure of a brake and an engine output is working, and
    the navigation information unnecessary state is where the vehicle stability control operation signal detecting unit continues to detect the operation signal for more than or equal to a predetermined time.

6. The power supply control apparatus of the navigation system as claimed in claim 5,
    wherein the power supply control unit turns the navigation power switching unit on when the power supply switch for a user is turned on after turning the navigation power switching unit off.

7. The power supply control apparatus of the navigation system as claimed in claim 1, further comprising:
    a whole power switching unit to turn off the power supply connection to the display screen and the internal function when the power switch for a user is turned off for more than or equal to a predetermined time, if the power switch for a user is turned on.

8. The power supply control apparatus of the navigation system as claimed in claim 7,
    wherein the power supply control unit turns the whole power switching unit on when the power switch for a user is turned on after the whole power switching unit turns the power supply connection off.

9. The power supply control apparatus of the navigation system as claimed in claim 7,
    wherein the whole power switching unit is connected in series to the navigation power switching unit.

10. The power supply control apparatus of the navigation system as claimed in claim 1, further comprising:
    a power switching unit for a user linked to the power switch for a user and to supply electric power for the navigation system in accordance with the power switch for a user,
    wherein the navigation power switching unit is connected in parallel to the power switching unit for a user.

* * * * *